(12) United States Patent
Yang et al.

(10) Patent No.: US 7,411,429 B2
(45) Date of Patent: Aug. 12, 2008

(54) SYSTEM AND METHOD FOR CLOCK SWITCHING

(75) Inventors: Chia-hao Yang, Douliou (TW); Tze-hsiang Chao, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 11/261,880

(22) Filed: Oct. 28, 2005

(65) Prior Publication Data

US 2007/0096774 A1 May 3, 2007

(51) Int. Cl.
*G06F 1/08* (2006.01)
(52) U.S. Cl. .......................... 327/99; 327/407
(58) Field of Classification Search .............. None
See application file for complete search history.

(56) References Cited

U.S. PATENT DOCUMENTS

| | | | |
|---|---|---|---|
| 7,038,510 B2 * | 5/2006 | Zhang | 327/158 |
| 7,046,058 B1 * | 5/2006 | Fang et al. | 327/158 |
| 2003/0006817 A1 * | 1/2003 | Seo et al. | 327/276 |
| 2003/0123594 A1 * | 7/2003 | Glenn et al. | 375/373 |
| 2003/0155953 A1 * | 8/2003 | Hirata et al. | 327/236 |
| 2004/0189363 A1 * | 9/2004 | Takano | 327/175 |
| 2004/0252804 A1 * | 12/2004 | Aoyama | 375/376 |
| 2005/0012528 A1 * | 1/2005 | Kodama | 327/105 |

\* cited by examiner

*Primary Examiner*—Cassandra Cox

(57) ABSTRACT

A system for clock-switching applied in the field of integrated circuits is described. A phase interpolator converts an input clock signal into a clock_A and a clock_B having a phase difference therebetween and transmitting the clock_A and the clock_B. A switch command unit connected to the phase interpolator receives either the clock_A or the clock_B serving as a triggering signal for triggering the switch command unit to transform an input switching signal into an output switching signal when the output switching signal is located in either a rising or a falling edge. A selecting device connected to the phase interpolator and the switch command unit, selects either clock_A or clock_B according to the output switching signal from the switch command unit to output a clock-switching signal composed of clock_A and clock_B.

23 Claims, 15 Drawing Sheets

SYSTEM AND METHOD FOR CLOCK SWITCHING

FIELD OF THE INVENTION

The present invention generally relates to the field of integrated circuits and more particularly, to a system and method for clock-switching applied in the field of integrated circuits.

BACKGROUND OF THE INVENTION

With more and more clocks having different phases being used in today's chips, there is often the need to switch the source clock to be used while the chip is running. Usually, the switching the source clock between two clocks having different phases is done by using a multiplexer in the hardware and may have a switch signal line to trigger the switching motion. The control signal is sometimes called "select" as we shall see in later references. Please refer to FIG. 1, which shows a traditional delay clock switching scheme. The upper area of FIG. 1 is the circuitry of the traditional delay clock switching and the lower area is the timing scheme of the clocks including clock_A, clock_B, clock_C, the "select" (switch signal), and the output clock. In this embodiment, the source clock signal is inputted from the "IN" side, through an operation device named A, through a second device named B, then through one other device named C. Three lines are stretched out from three points A, B, C to be connected to the delay selector which receives all three clocks, clock_A, clock_B and clock_C having phase difference from each other as shown in the timing scheme. The delay selector generates an output clock on the output clock line (it's shown as "OUT" in FIG. 1). At the time point_A, the delay selector receives a control signal aforementioned "select", which is switching from B to C shown in FIG. 1. The timing scheme means that the delay selector switches the output clock from clock_B to clock_C at the time point_A by the select from B to C. As a result, a glitch happens due to the immediate switching of the output clock from clock_B to clock_C when the select value changes.

Furthermore, please refer to FIG. 2, a delay clock switching scheme of another embodiment that the clock switching progresses in a conventional way. As the same of FIG. 1, the upper area of FIG. 2 is the circuitry of the traditional delay clock switching and the lower area of FIG. 2 is the timing scheme of the clocks including clock_A, clock_B, a switch signal (select), and an output clock. In this embodiment, the source clock signal is inputted from the "IN" side, then to be split into two clocks having phase difference, clock_A and clock_B. Two lines are stretched out to connect a multiplexer as an output device to generate the output clock. In this case, at the time point_A, the clock_A is progressing at the rising edge of the phase; and at the time point_B, the clock_B is progressing at the rising edge of the phase. However, the select changes at the time point in-between. The outcome of the glitch happening cannot be avoided due to the immediate switching of the output clock from clock_A to clock_B when the select value changes.

In the prior art, either of the embodiment shown in FIG. 1 or in FIG. 2, cannot prevent the glitch from happening at the output clock because of the circuitry design to provide only the immediate switching of the output clock. However, with more and more clocks having different phases necessary to be used in today's chips, the prevention of glitch happening at the switching clock at any time point reference becomes an important topic. This importance is especially apparent when the chip today is getting more complicated and multi-functional, even more source clocks are to be implemented and switched as a reference for perhaps thousands of processes in chip thereafter. A precise and clear clock without any glitch is necessary for a chip to keep a smooth operation inside or even to avoid the whole chip operation of a crash down. Consequently, there is a need to develop a system and method for clock-switching to provide prevention against glitches at the output clock.

SUMMARY OF THE INVENTION

One object of the present invention is to provide a system and method for clock-switching to prevent the glitch happening when the clock in the integrated circuits switches.

Another object of the present invention is to provide a system and method for clock-switching to use the lagging clock of two clocks having phase difference as the triggering signal to switch the clock in the integrated circuits.

According to the above objects, the present invention sets forth a system and method for clock-switching. The system and method for clock-switching is described below. The system for clock-switching comprises a phase interpolator, a switch command unit and a selecting device. The phase interpolator generates a clock_A and a clock_B having a phase difference therebetween and transmits the clock_A and the clock_B. The switch command unit connected to the phase interpolator receives either clock_A or clock_B serving as a triggering signal for triggering the switch command unit to transform an input switching signal into an output switching signal on either a first rising or a first falling edge of the triggering signal after receiving the input switching signal. In addition, the selecting device connected to the phase interpolator and the switch command unit selects either clock_A or clock_B according to the output switching signal from the switch command unit to output a clock-switching signal composed of clock_A and clock_B. Furthermore, according to the second embodiment, the switch command unit comprises a second selecting device and a gating unit. From such point of view, we name the selecting device first selecting device. The second selecting device selects either clock_A or clock_B by the selecting signal to generate a gating clock signal. The gating unit which is coupled to the first and second selecting devices, gates the input switching signal according to the gating clock signal to generate the output switching signal on either a first rising or a first falling edge of the triggering signal after receiving the input switching signal.

Moreover, one of the clocks, either clock_A or clock_B, is lagging behind the other one. The lagging one will be used as the triggering signal for triggering the switch command unit for further steps. Besides, because the output switching signal is located on either a first rising or a first falling edge of the triggering signal after receiving the input switching signal and is aligned to one edge of the lagging one, either clock_A or clock_B, the selecting device will surely switch the clock-switching signal at the edge of the output switching signal, i.e. switching at the edge of the lagging one of the clocks clock_A or clock_B. Specifically, the phase difference between clock_A and clock_B is smaller than half a period of clock_A or clock_B.

The method for clock-switching comprises the steps described below. First, the phase interpolator generates a clock_A and a clock_B having the phase difference therebetween. The triggering signal is generated by either clock_A or clock_B for triggering the switch command unit. The switch command unit transforms the input switching signal into the output switching signal by the triggering signal of the switch command unit, located on either a rising or a falling edge of the triggering signal. The selecting device (or the first selecting device) selects either clock_A or clock_B according to the output switching signal from the switch command unit. Thereafter, the selecting device outputs a clock-switching signal composed of clock_A and clock_B.

In one embodiment of the present invention, during the step of transforming the input switching signal, the second selecting device further switches clock_A and clock_B by inputting a selecting signal into the second selecting device in the switch command unit to generate the gating clock signal corresponding to the triggering signal. Before the step of switching the clock_A and the clock_B, the gating unit further gates the input switching signal according to the gating clock signal to generate the output switching signal. Specifically, the selecting device (or the first selecting device) outputs the clock-switching signal when both the clock_A and the clock_B are high or low and the clock-switching signal switches at the edge of clock_A or clock_B whichever has the lag phase in respect to the other one.

In conclusion, the merits of the present invention are: (a) use the lagging clock as the triggering signal to switch the clock in the integrated circuits to simplify the system for clock-switching, and (b) prevent the glitch happening when the clock in the integrated circuits switches.

BRIEF DESCRIPTION OF THE DRAWINGS

The foregoing aspects and many of the attendant advantages of this invention will become more readily appreciated as the same becomes better understood by referring to the following detailed description when taken in conjunction with the accompanying drawings, wherein.

DETAILED DESCRIPTION OF THE PREFERRED EMBODIMENTS

The present invention provides a system for clock-switching and method thereof. Such system and method thereof for switching two clocks for preventing glitches happening is applied in running chips.

Figure 1:
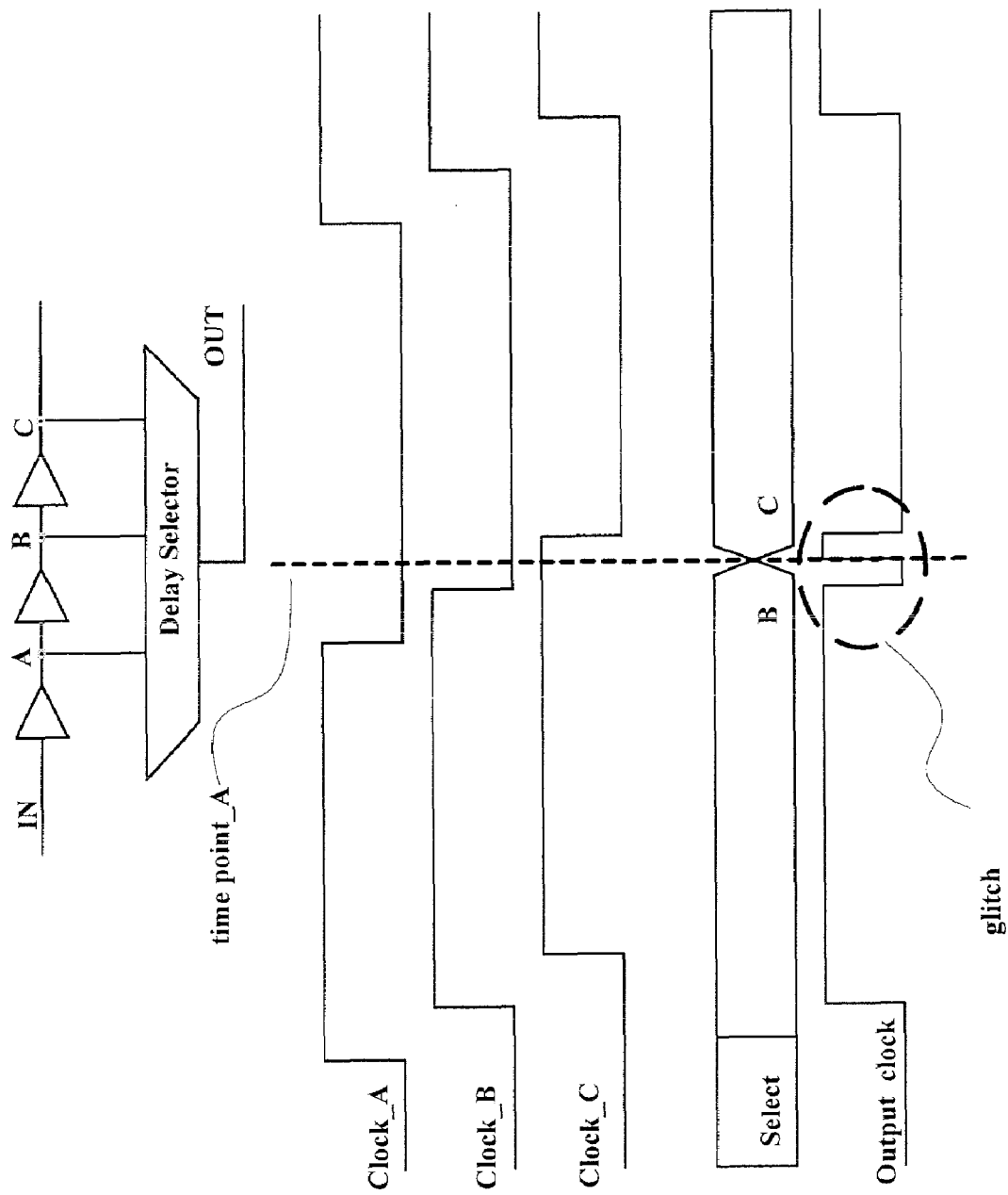
FIG. 1 is a traditional delay clock switching scheme according to a prior art.
Figure 2:
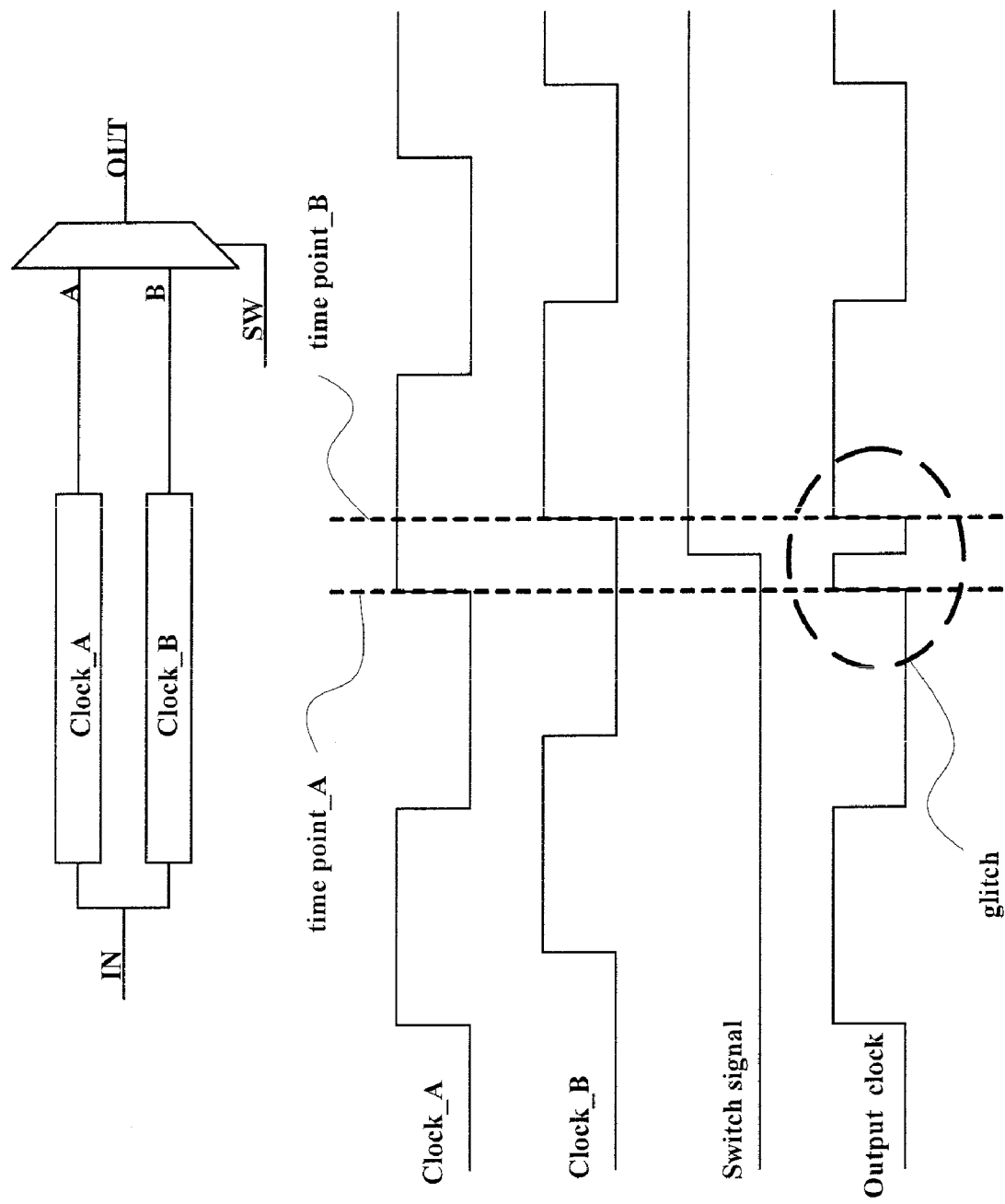
FIG. 2 is a traditional delay clock switching scheme according to another prior art.
Figure 3:
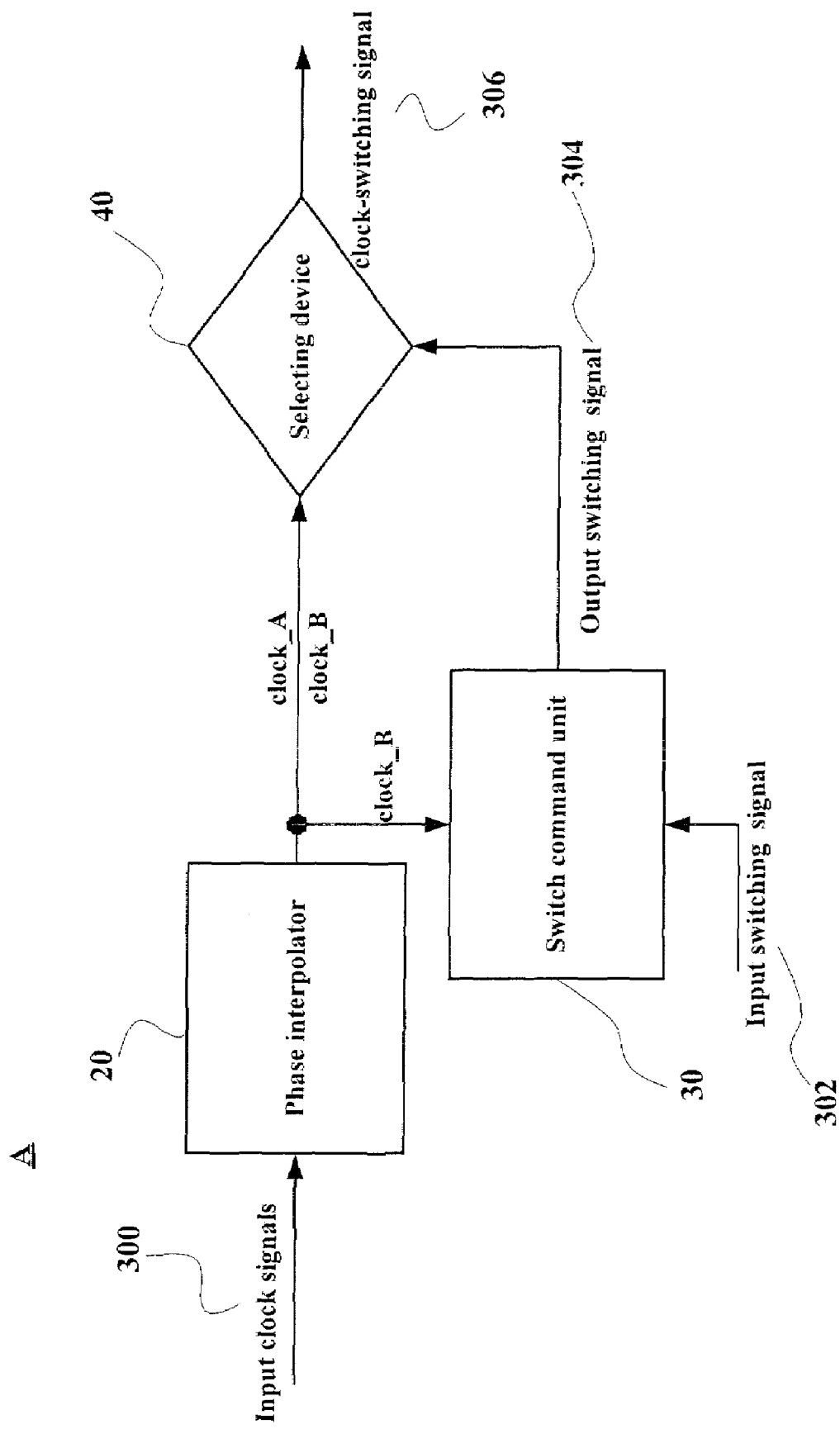
FIG. 3 is a block diagram illustrating a clock-switching according to first embodiment system of present invention.

Please refer to FIG. 3. It illustrates a block diagram for clock-switching according to the first embodiment system of the present invention. The system for clock-switching A comprises a phase interpolator 20, a switch command unit 30 and a selecting device 40. As well known, a phase interpolator can interpolate phases of a plurality of input clock signals and derives a phase-interpolated output clock signal. Therefore, the phase interpolator 20 of the present invention can receives a plurality of input clock signals 300 and generates a clock_A and a clock_B having a phase difference therebetween and transmits clock_A and clock_B. In this embodiment, the switch command unit connected to the phase interpolator receives clock_B serving as a triggering signal for triggering the switch command unit 30 to transform an input switching signal 302 into an output switching signal 304. Furthermore, the selecting device 40 connected to the phase interpolator 20 and the switch command unit 30, selects clock_B according to the output switching signal 304 from the switch command unit 30 to output a clock-switching signal 306 composed of clock_A and clock_B. More importantly, the reason to use clock_B serving as a triggering signal is that clock_B is lagging behind clock_A to simplify the system for clock-switching.

Figure 4A:
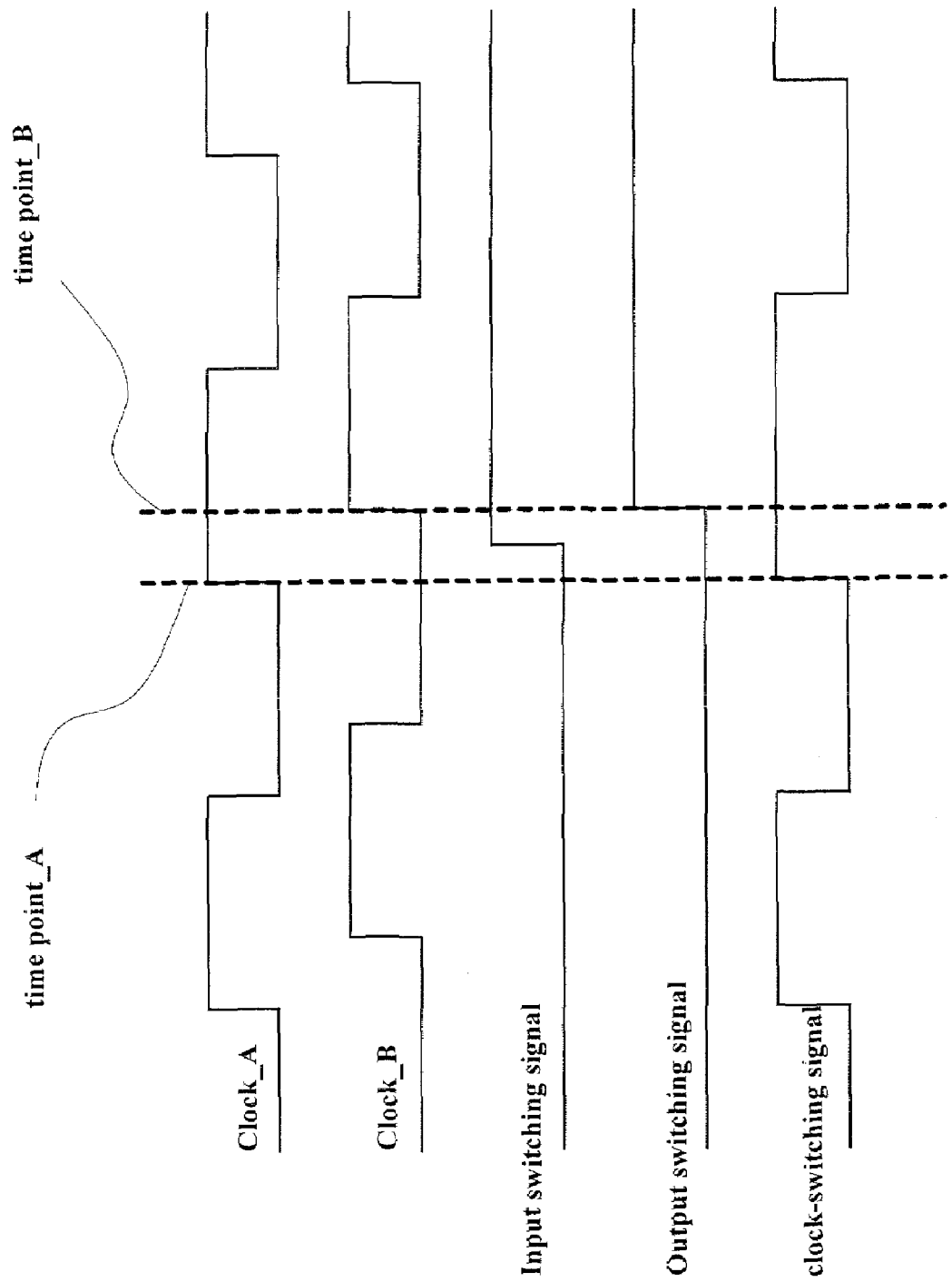
FIG. 4A and FIG. 4B are shown two clock-switching schemes of the embodiment system showed in FIG. 3 according to present invention.

Please refer to FIG. 4A, a clock-switching scheme of the embodiment system that is shown in FIG. 3. According to present invention with FIG. 3, at time point_A, the clock_A is located in the rising edge, and the clock_B is lagging behind clock_A. The output clock now is clock_A. After some time, the input switching signal 302 changes. However, the switch command unit 30 will not transform the input switching signal 302 into the output switching signal 304 until the time point_B when clock_B is located in the rising edge and both clock_A and clock_B are high. At time point_B, the edge of the output switching signal following the input switching signal is also aligned to one edge of clock_B. Thereafter, the selecting device 40 switches the output clock according to the output switching signal 304b from the switch command unit 30. The output clock now is clock_B. The selecting device 40 outputs a clock-switching signal from clock_A to clock_B at the time point_B.

Figure 4B:
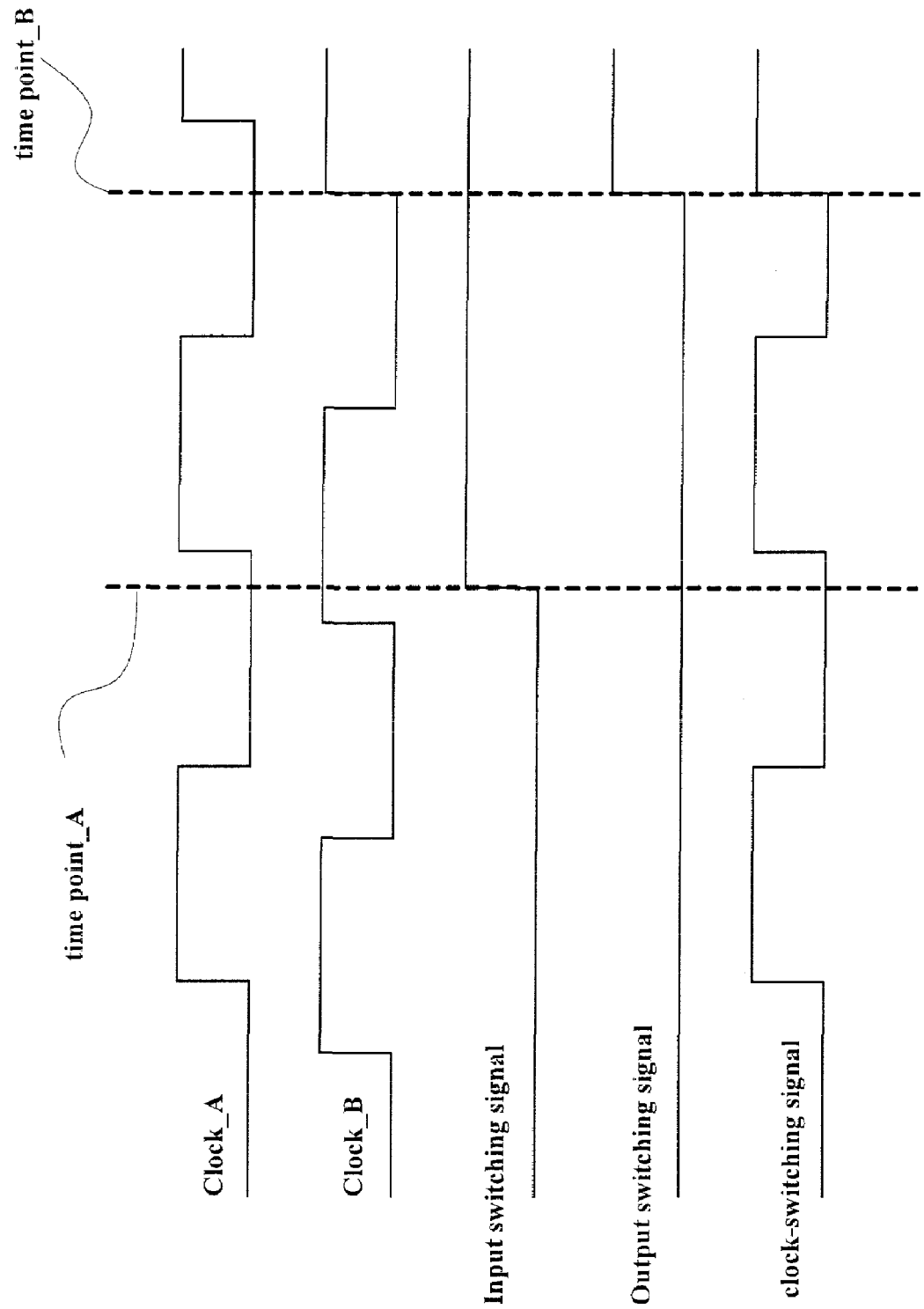

Further referring to FIG. 4B, a clock-switching scheme of the embodiment system that is shown in FIG. 3. According to present invention with FIG. 3, clock_B is lagging behind clock_A as the same shown in FIG. 4A. At the time point_A, clock_A is not located in a rising edge or a falling edge but the input switching signal 302 changes. The output clock now is clock_A. However, the switch command unit 30 will not transform the input switching signal 302 into the output switching signal 304 until the time point_B when clock_B is located in a rising edge and both clock_A and clock_B are low. At the time point_B, the edge of the output switching signal following the input switching signal is aligned to one edge of clock_B. Thereafter, the selecting device 40 switches the output clock according to the output switching signal 304b from the switch command unit 30. The output clock now is clock_B. The selecting device 40 outputs a clock-switching signal from clock_A to clock_B at the time point_B.

Figure 5:
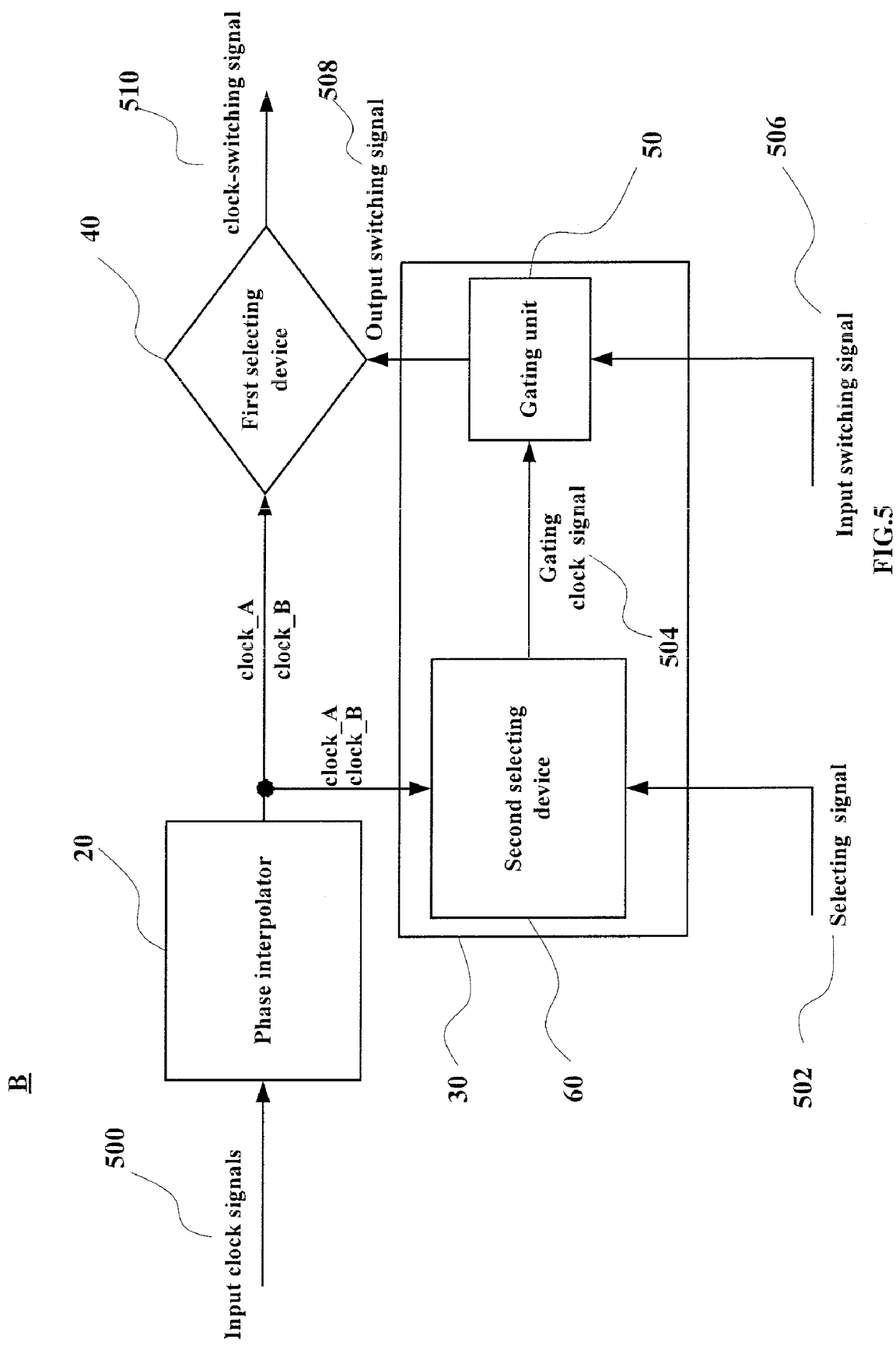
FIG. 5 is a block diagram illustrating a clock-switching according to the second embodiment system of the present invention.

Please refer to FIG. 5, a block diagram illustrating a clock-switching according to a second embodiment system of present invention. The system for clock-switching B comprises a phase interpolator 20, a switch command unit 30 and a first selecting device 40 wherein the switch command unit 30 further comprises a second selecting device 60 and gating unit 50. The phase interpolator 20 converts an input clock signal 500 into a clock_A and a clock_B having a phase difference therebetween and transmits the clock_A and the clock_B. In this embodiment, the second selecting device 60 in the switch command unit 30 connected to the phase interpolator 20, receives both the clock_A and the clock_B to select either the clock_A or the clock_B by the selecting signal 502 to generate a gating clock signal 504. The gating unit 50 coupled to the first selecting device 40 and second selecting device 60 gates the input switching signal 506 according to the gating clock signal 504 to generate the output switching signal 508 located on either a first rising or a first falling edge of the triggering signal (the lagging one of the clock_A and clock_B) after receiving the input switching signal. The first selecting device 40 outputs a clock-switching signal composed of clock_A and clock_B. In this embodiment, the present invention is able to select clock_A or clock_B as the triggering signal actively when clock_B has a lag phase with respect to clock_A or vice versa.

Figure 6A:
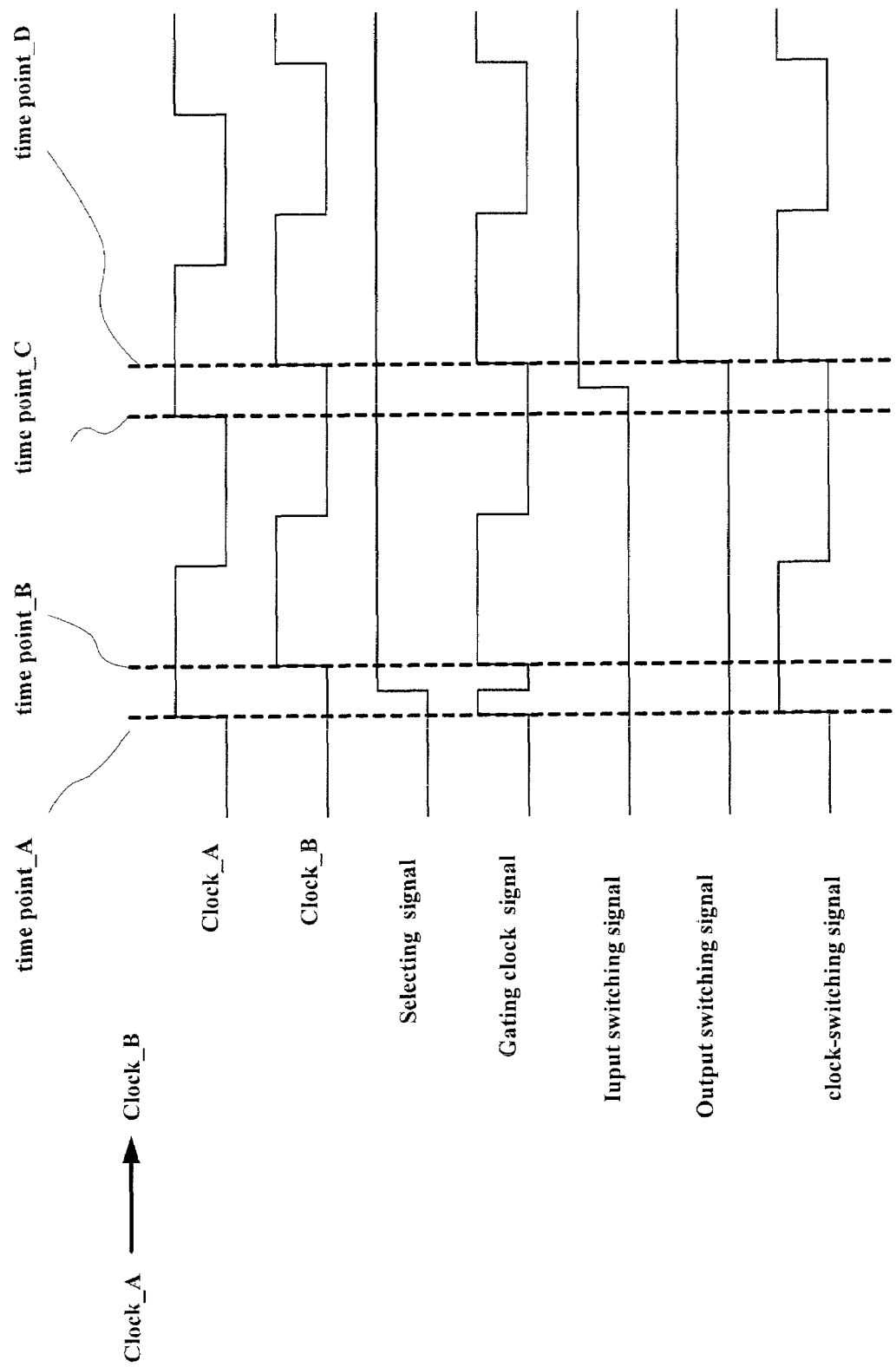
FIG. 6A is a clock-switching scheme of the embodiment system showed in FIG. 5 when signal is switched from clock_A to clock_B according to present invention.

Please refer to FIG. 6A, which is a clock-switching scheme of the embodiment system shown in FIG. 5 when a signal is switched from clock_A to clock_B according to present invention. At the time point_A, clock_A is located at a rising edge and clock_B is lagging behind clock_A. The output clock now is clock_A. After some time, the selecting signal 502 changes, and the second selecting device 60 selects clock_B by the selecting signal 502 immediately in order to generate a gating clock signal 504 as shown in the scheme. A glitch happens at the gating clock signal 504 but not at the output clock. After the glitch happened, the gating clock signal 504 has already switched from clock_A to clock_B. At the time point later than time point_C when clock_A is located in the raising edge, the input switching signal 506 changes, but the gating unit 50 doesn't gate the input switching signal 506 until the time point_D when the output switching signal 508 is located in a rising edge. At the time point_D the gating unit 50 gates the input switching signal 506 according to the gating clock signal 504 to generate the output switching signal 508. The output clock now is clock_B. The first selecting device 40 outputs a clock-switching signal composed of clock_A and clock_B with no glitches.

Figure 6B:
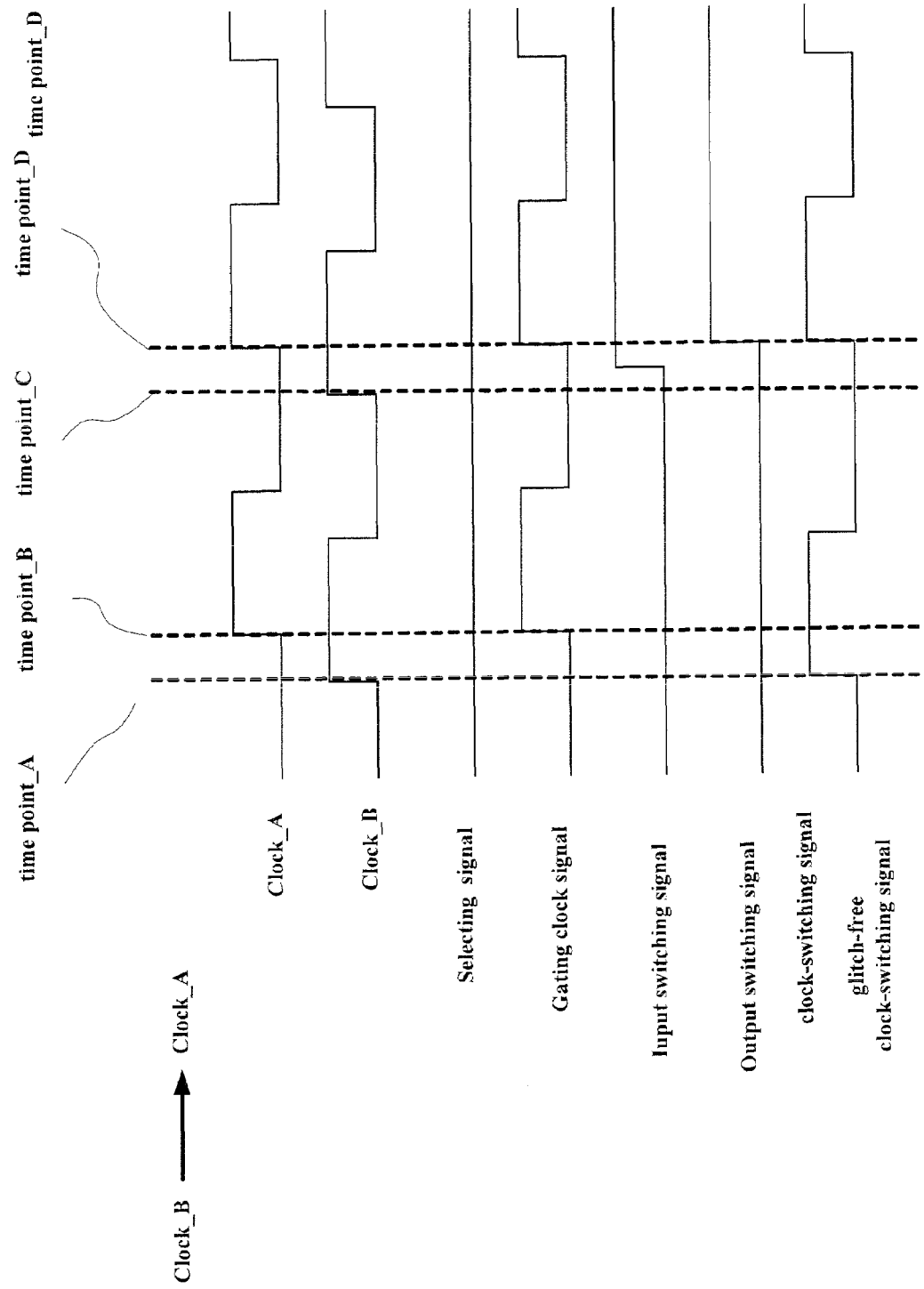
FIG. 6B is a clock-switching scheme of the embodiment system showed in FIG. 5 when signal is switched from clock_B to clock_A according to present invention.

Further referring to FIG. 6B, which is a clock-switching scheme of the embodiment system that is shown in FIG. 5 when the signal is switched from clock_B to clock_A according to present invention. At the time point_A, clock_B is located in a rising edge and clock_A is lagging behind clock_B. The output clock is now clock_A. The second selecting device 60 selects clock_A by the selecting signal 502 immediately to generate a gating clock signal 504 as shown in the scheme. At the time point_B, the gating clock signal 504 has already switched from clock_B to clock_A. At the time later than the time point_C when clock_B is located in the raising edge, the input switching signal 506 changes, but the gating unit 50 doesn't gate the input switching signal 506 until the time point_D when the output switching signal 508 is located in a rising edge. At the time point_D the gating unit 50 gates the input switching signal 506 according to the gating clock signal 504 to generate the output switching signal 508. The output clock now is clock_A. Finally, the first selecting device 40 outputs a clock-switching signal composed of clock_A and clock_B.

Figure 7:
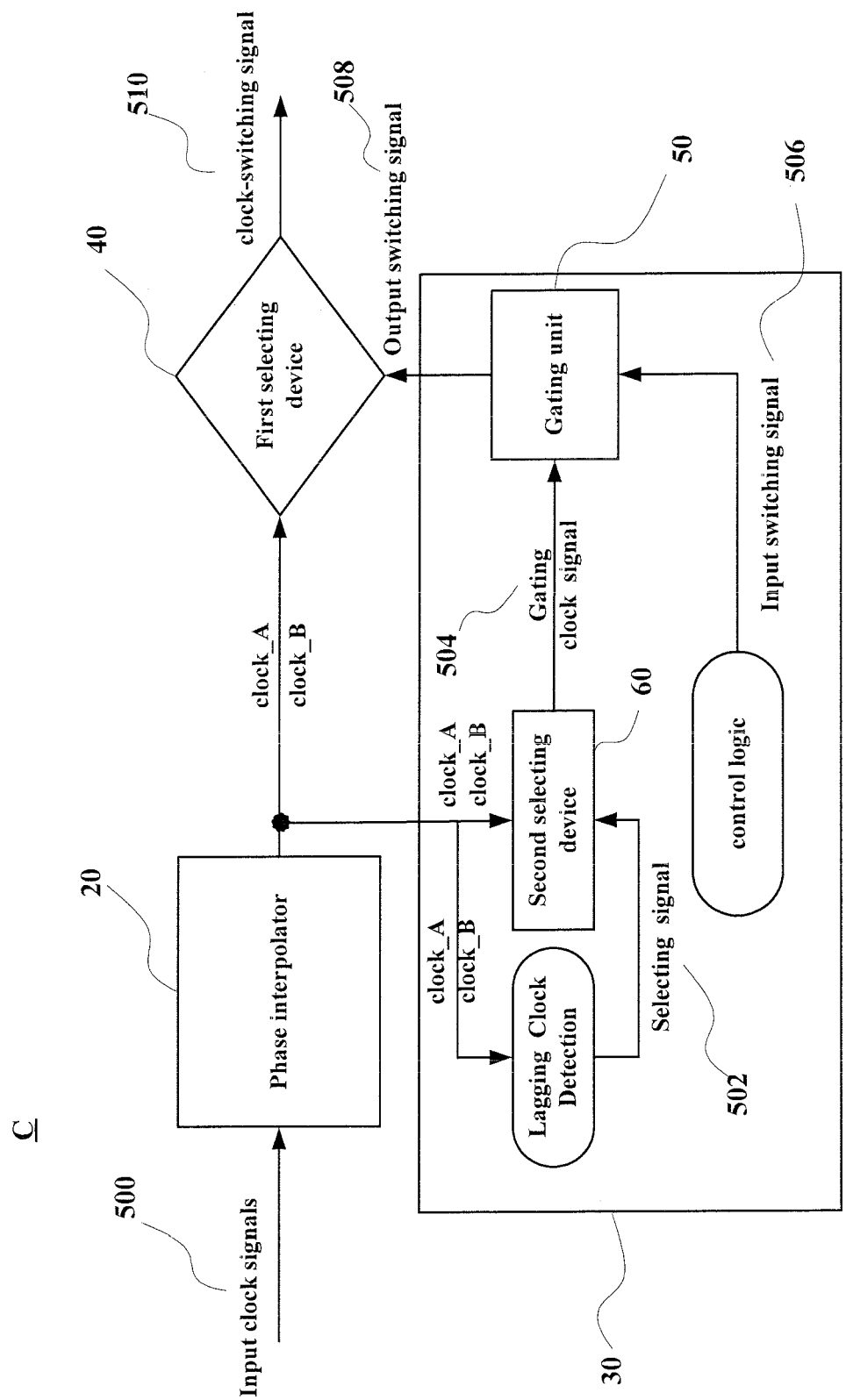
FIG. 7 is a variation block diagram illustrating a clock-switching, which the selecting signal and the input switching signal come from the circuitry designed in the switch command unit according to the third embodiment system of present invention.

Please refer to FIG. 7. It shows a variation block diagram illustrating a clock-switching, which the selecting signal and the input switching signal come from the circuitry designed inside the switch command unit according to the third embodiment system of present invention. In the first embodiment shown in FIG. 3 and the second embodiment shown in FIG. 5, the input switching signal 302 or 506 and the selecting signal 502 come from outside the clock switching system A and B. However, these signal sources can be designed in the switch command unit 30 in the clock switching system C. With an added control logic design to diagnose the triggering clock, the switch command unit 30 generates the input switching signal 302 or 506. Compared with FIG. 3, the reason to use clock_B serving as a triggering signal is that clock_B is lagging behind clock_A. Inversely, clock_A will be used to serve as a triggering signal once clock_A is lagging behind clock_B. With an added lagging clock detection design to diagnose the lagging clock of clock_A and clock_B, the switch command unit 30 generates the selecting signal 502. Compare with FIG. 5, the second selecting device 60 in the switch command unit 30 receives both clock_A and clock_B to select either clock_A or clock_B by the selecting signal 502 to generate a gating clock signal 504. In this embodiment, the present invention discloses that the source of the selecting signal and the input switching signal can be generated either by the circuitry designed inside the switch command unit 30 or outside the clock switching system as the present invention is applied in chips.

Figure 8A:
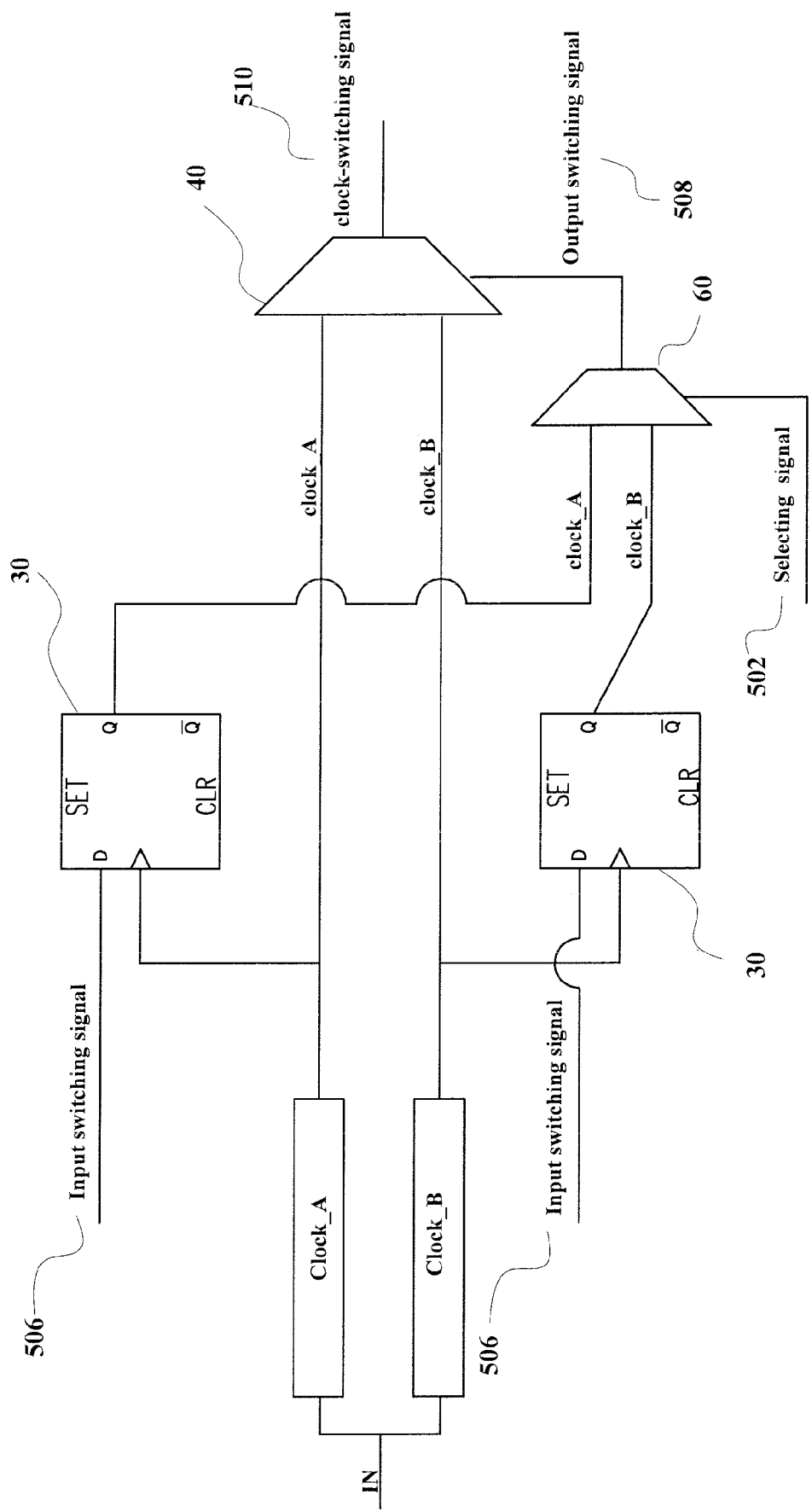
FIG. 8A shows an embodiment of variation circuitry of the clock-switching system according to present invention.

Please refer to FIG. 8A, which shows an embodiment of a variation of circuitry of the clock-switching system according to present invention. In this variational circuitry, a multiplexer is used as a selecting device 40 for the output of the clock-switching signal 510. Two flip-flops are used as two switching command units 30 to let the clock_A or the clock_B pass through according to the input switching signals 506. Another multiplexer is used as the second selecting device 60 to select one of the clocks, clock_A or clock_B, to be the output switching signal 508. The previously mentioned multiplexer outputs the clock-switching signal 510 composed of clock_A and clock_B according to the output switching signal 508.

Figure 8B:
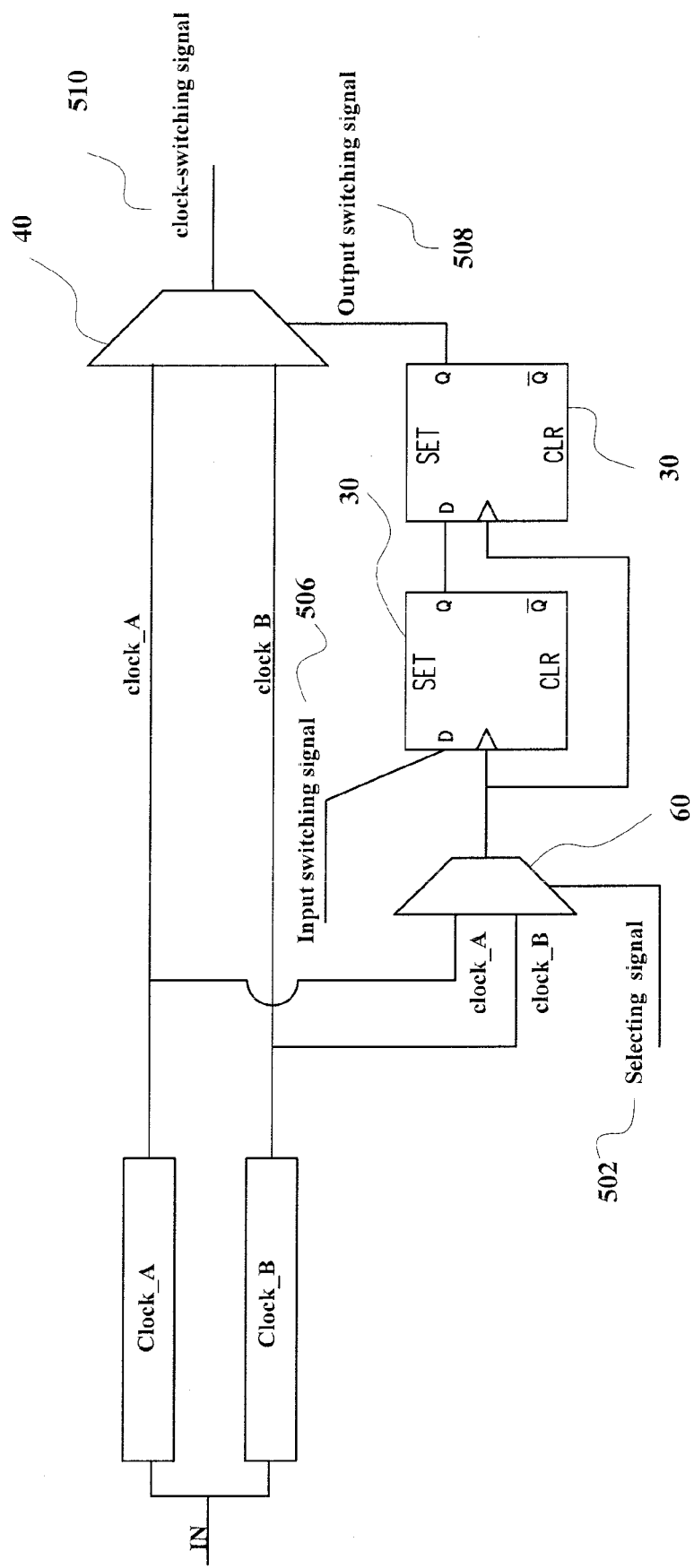
FIG. 8B shows an embodiment of another variation circuitry of the clock-switching system according to present invention.

Please refer to FIG. 8B, a showing of an embodiment of another variation circuitry of the clock-switching system according to present invention. Same as FIG. 8A, one multiplexer is used as a selecting device 40 for output of the clock-switching signal 510. Another multiplexer is used as the second selecting device 60 to select one of either clock_A or clock_B to be the triggering signal. After the multiplexer as the second selecting device 60, two flip-flops are used as two switching command units 30 to transform clock_A or clock_B into the output switching signal 508 according to the input switching signals 506.

Please refer to FIG. 9A~9G, seven embodiments of the selecting device as shown in FIG. 3 or the first selecting device as shown in FIG. 5.

Figure 9A:
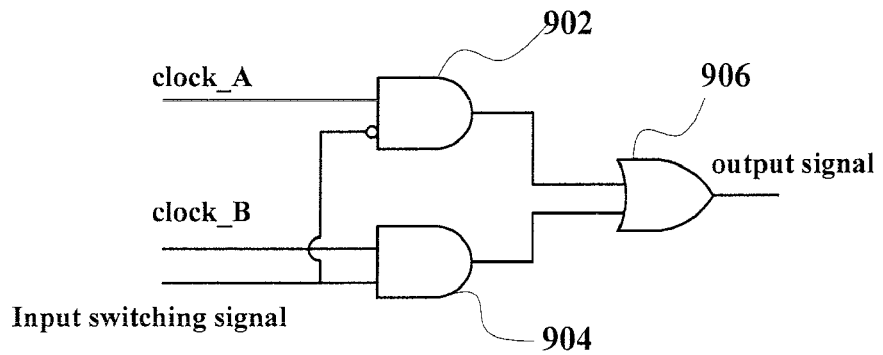
FIG. 9A~9G shows seven embodiments of the selecting device shown in FIG. 3 or the first selecting device shown in FIG. 5.
Figure 9B:
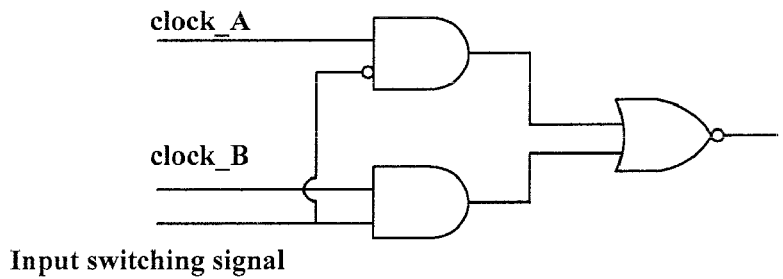
Figure 9C:
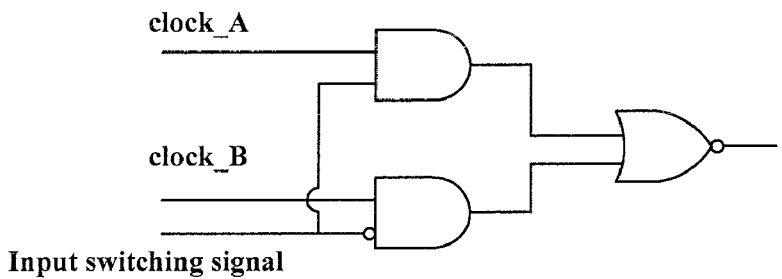
Figure 9D:
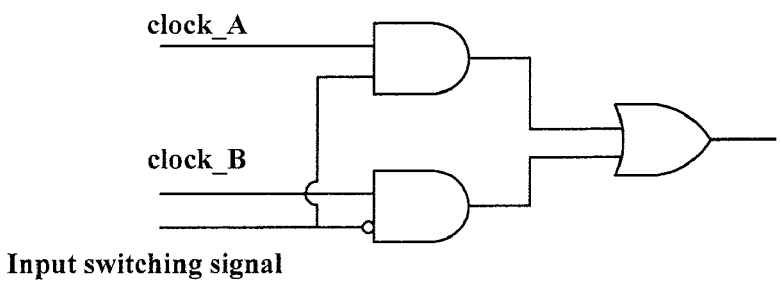
Figure 9E:
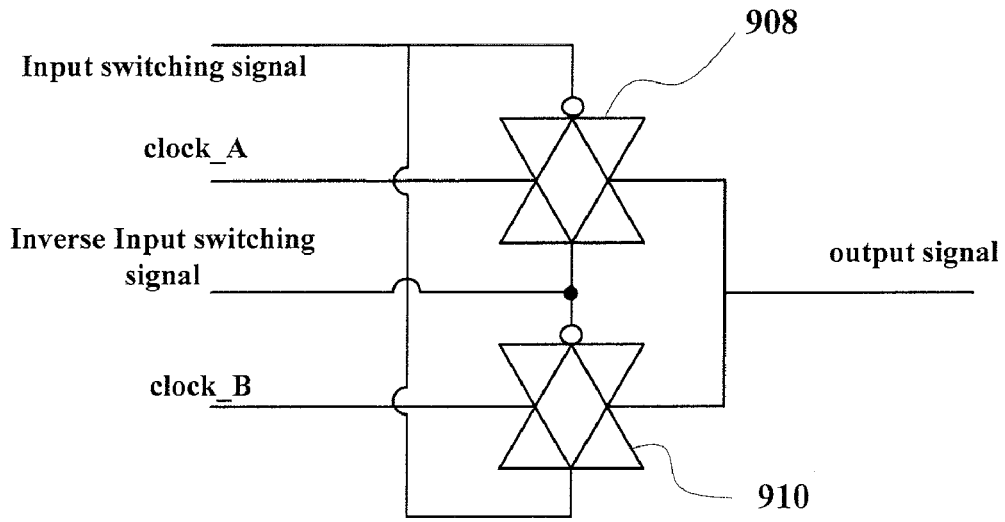
Figure 9F:
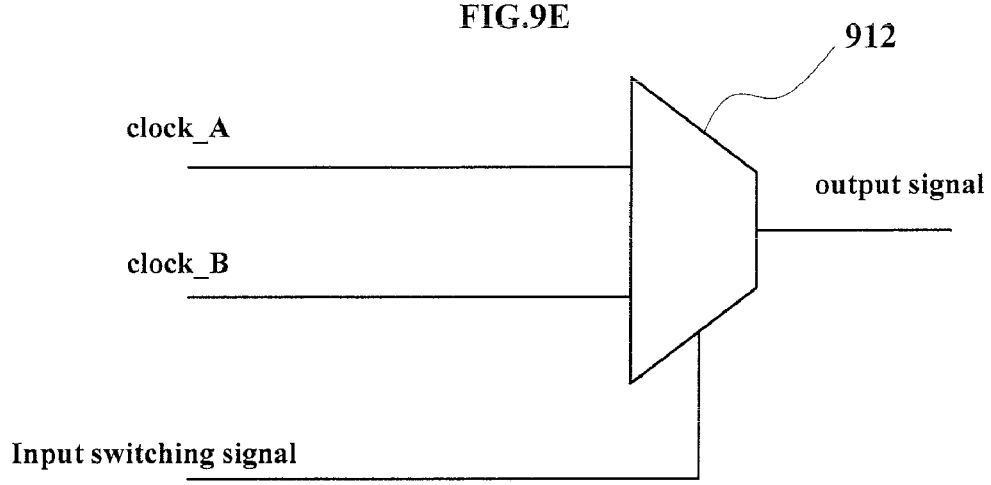
Figure 9G:
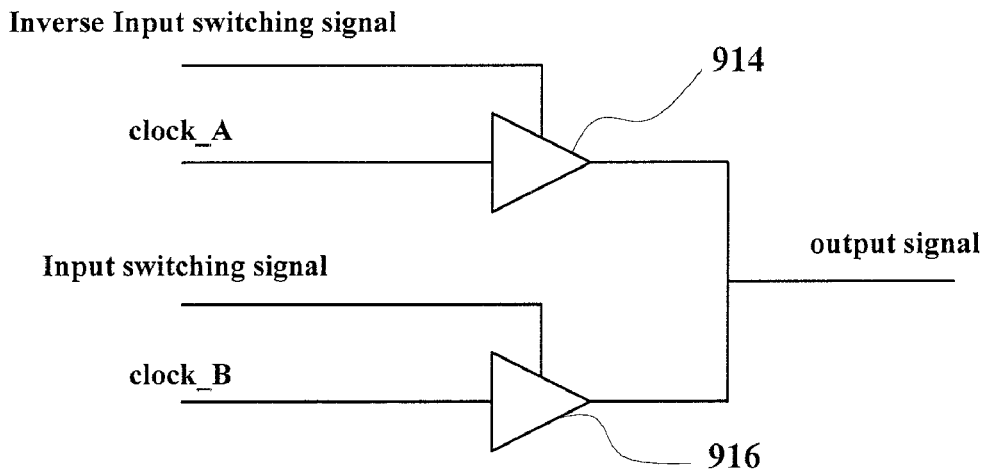

For example, please see FIG. 9A. The clock_A and clock_B are always inputted. If the input switching signal is 1, then clock_B is the output signal; if the input switching signal is 0, then clock_A is the output signal. The devices (902, 904, and 906) are gates. As the same, these logic combination gates shown in FIG. 9B~9D can provide the same selecting function for the selecting device in present invention with the proper design. Showing the following embodiments disclose not only the logic combination gates but also other electrical circuits, such as transmission gates (908, 910), multiplexer 912, select circuits (914, 916), as shown in FIG. 9E, FIG. 9F and FIG. 9G, which can be the selecting device in present invention for processing switching between two clocks. For example, please see FIG. 9E, clock_A and clock_B are always inputted. If the input switching signal is 1, then clock_B is the output signal; if the input switching signal is 0, then clock_A is the output signal. The same results are provided by the embodiments shown in FIG. 9F and FIG. 9G. Furthermore, it shows the ability to treat multi-signals analogously.

Figure 10:
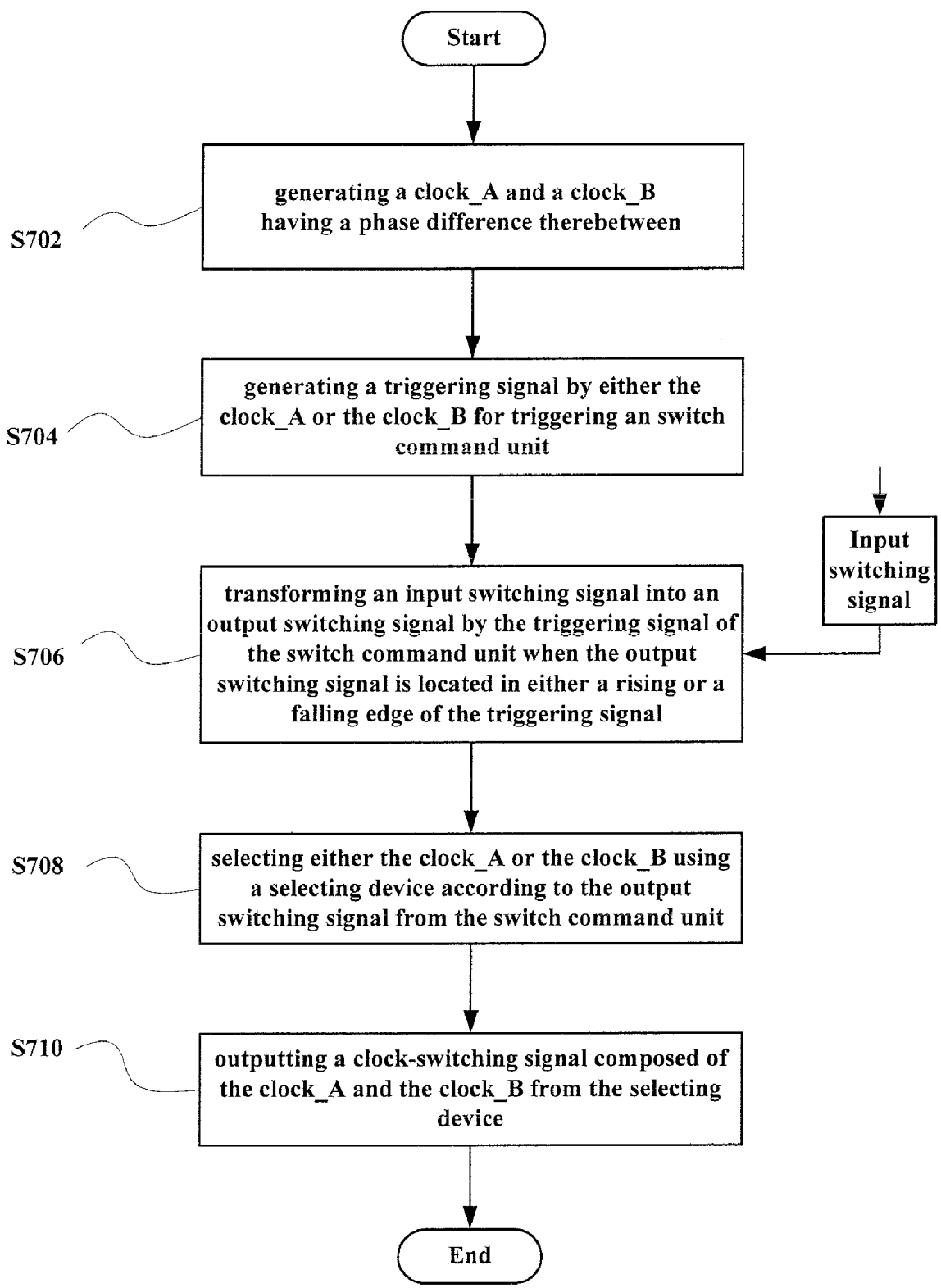
FIG. 10 is a flow chart of the method for clock-switching corresponding to the first embodiment shown in FIG. 3 according to the present invention.

Please refer to FIG. 10, a flow chart illustrating the method for clock-switching according to first embodiment of the present invention.

In step S702, generating a clock_A and a clock_B having the phase difference therebetween;

In step S704, generating a triggering signal by either clock_A or clock_B for triggering a switch command unit;

In step S706, transforming an input switching signal into an output switching signal by the triggering signal of the switch command unit, located on either a first rising or a first falling edge triggering signal after receiving the input switching signal;

In step S708, selecting either clock_A or clock_B using a first selecting device according to the output switching signal;

In step S710, outputting a clock-switching signal composed of clock_A and clock_B from the selecting device.

Figure 11:
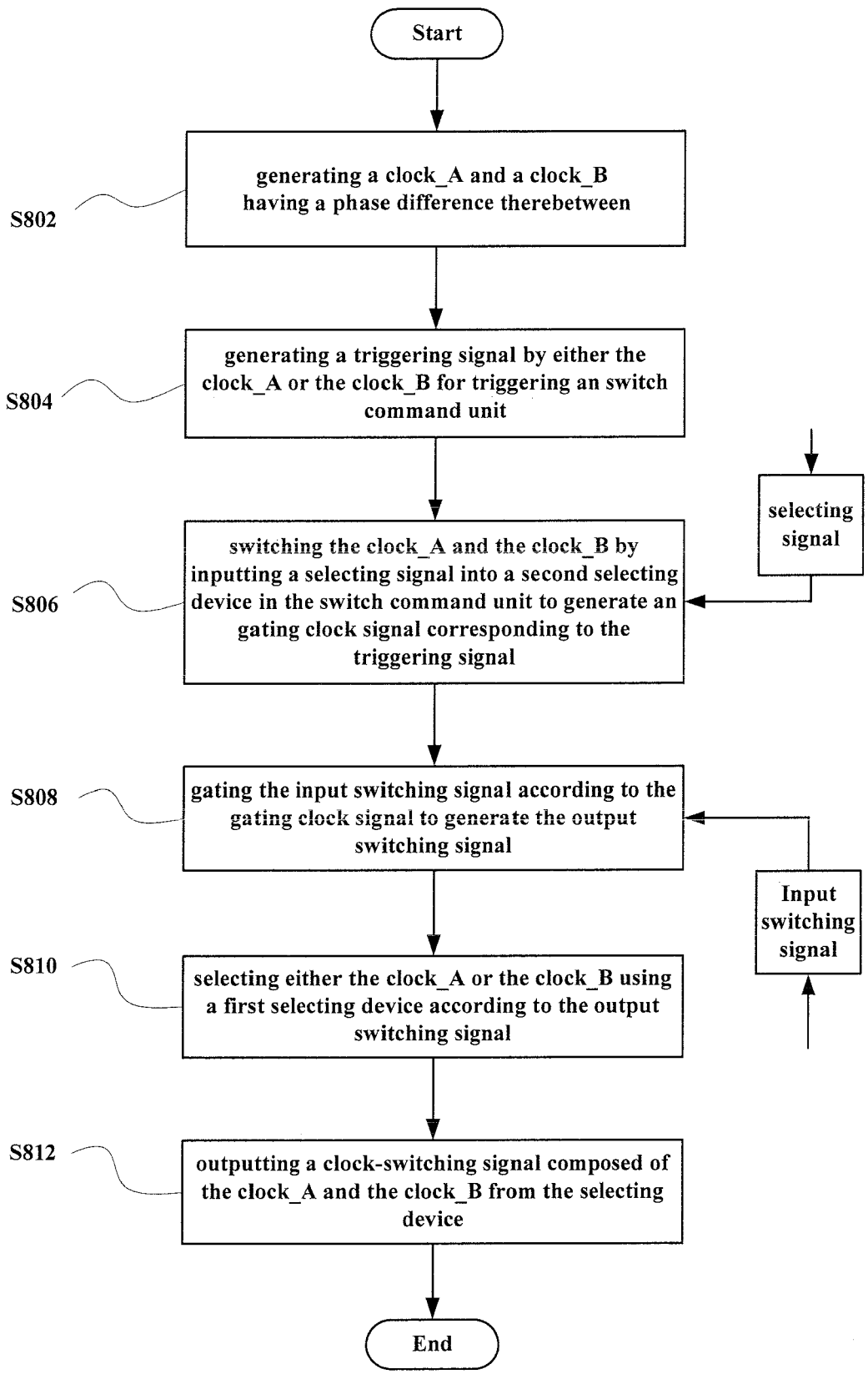
FIG. 11 is another flow chart of the method for clock-switching corresponding to the second embodiment shown in FIG. 5 according to the present invention.

Please refer to FIG. 11, a flow chart illustrating the method for clock-switching according to second embodiment of the present invention. To be able to select clock_A or clock_B as the triggering signal actively, the present invention adds the second selecting device and the gating unit. Thereafter, the method for clock-switching adds the steps of S806, and S808 to achieve a better function for actively selecting triggering signal from clock_A or clock_B. The steps of the method are described below.

In step S802, generating converting an input clock signal into a clock_A and a clock_B having the phase difference therebetween;

In step S804, generating a triggering signal by either clock_A or clock_B for triggering a switch command unit;

In step S806, switching clock_A and clock_B by inputting a selecting signal into a second selecting device in the switch command unit to generate a gating clock signal corresponding to the triggering signal;

In step S808, gating the input switching signal according to the gating clock signal to generate the output switching signal;

In step S810, selecting either clock_A or clock_B using a first selecting device according to the output switching signal;

In step S812, outputting a clock-switching signal composed of clock_A and clock_B from the selecting device.

The merits of the present invention are: (a) use the lagging clock as the triggering signal to switch the clocks in the integrated circuits to simplify the system for clock-switching, and (b) prevent the glitch happening when the clock in the integrated circuits switches.

In conclusion, the system according to the present invention prevents glitch happening due to the system's circuitry design. Either the design of the first or the second embodiments of the present invention delays the clock switching to align with the triggering clock. It provides an excellent prevention from glitch happening even when the input switching signal does not change in a rising or falling edge of the triggering clock (signal) exactly. The second embodiment is basically propagated from the first embodiment but with an additional of a second selecting device, the invention is able to select clock_A or clock_B as the triggering signal actively. The method of the second embodiment is also propagated based on the method of the first embodiment.

As is understood by a person skilled in the art, the foregoing preferred embodiments of the present invention are illustrative rather than limiting of the present invention. It is intended that they cover various modifications and that similar arrangements can be included within the spirit and scope of the appended claims. Furthermore, the scope of which should be accorded to the broadest interpretation so as to encompass all such modifications and similar structure.

What is claimed is:

1. A system for clock-switching, the system comprising:
   a phase interpolator, generating a clock_A and a clock_B having a phase difference therebetween and transmitting the clock_A and the clock_B;
   a switch command unit connected to the phase interpolator, receiving either the clock_A or the clock_B serving as a triggering signal for triggering the switch command unit to transform an input switching signal into an output switching signal located on either a first rising or a first falling edge of the triggering signal after receiving the input switching signal; and
   a selecting device connected to the phase interpolator and the switch command unit, selecting either the clock_A or the clock_B according to the output switching signal from the switch command unit to output a clock-switching signal composed of the clock_A and clock_B.

2. The system of claim 1, wherein the clock_B has a lag phase with respect to the clock_A.

3. The system of claim 2, wherein one edge of the output switching signal following one edge of the input switching signal is aligned to one edge of the clock_B.

4. The system of claim 3, wherein the clock-switching signal generated from the selecting device is switched from the clock_A to the clock_B at the edge of the output switching signal from the switch command unit.

5. The system of claim 1, wherein the phase difference between the clock_A and the clock_B is smaller than half a period of the clock_A or the clock_B.

6. The system of claim 5, wherein the selecting device outputs the clock-switching signal when both the clock_A and the clock_B are high or low.

7. The system of claim 1, wherein the clock_A has a lag phase with respect to the clock_B.

8. The system of claim 7, wherein one edge of the output switching signal following one edge of the input switching signal is aligned to one edge of the clock_B.

9. The system of claim 8, wherein the clock-switching signal generated from the selecting device is switched from the clock_B to the clock_A at the edge of the output switching switch signal from the switch command unit.

10. A system for clock-switching, the system comprising:
    a phase interpolator, generating a clock_A and a clock_B having a phase difference therebetween and transmitting the clock_A and the clock_B;
    a switch command unit connected to the phase interpolator, receiving the clock_A and the clock_B serving as a triggering signal for triggering the switch command unit and switching the clock_A and the clock_B by a selecting signal to generate an output switching signal corresponding to the triggering signal; and
    a first selecting device connected to the phase interpolator and the switch command unit, receiving the clock_A and clock_B and selecting either the clock_A or clock_B according to the output switching signal from the switch command unit to output a clock-switching signal composed of the clock_A and clock_B.

11. The system of claim 10, wherein the switch command unit comprises:
a second selecting device, selecting either the clock_A or the clock_B by the selecting signal to generate a gating clock signal; and
a gating unit coupled to the first and second selecting device, gating an input switching signal according to the gating clock signal to generate the output switching signal located in either a rising or a falling edge of the triggering signal.

12. The system of claim 10, wherein the triggering signal is one of the clock_A or clock_B which has a lag phase with respect to another according to the selecting signal.

13. The system of claim 12, wherein the one edge of the output switching signal following one edge of the input switching signal is aligned to one edge of the gating clock signal.

14. The system of claim 13, wherein the clock-switching signal generated from the first selecting device is switched between the clock_A and clock_B at the edge of the output switching signal from the gating unit.

15. The system of claim 10, wherein the phase difference between the clock_A and the clock_B is smaller than half a period of the clock_A or the clock_B.

16. The system of claim 15, wherein the selecting device outputs the clock-switching signal when both the clock_A and the clock_B are high or low.

17. A method of performing a clock-switching between clock_A and clock_B having a phase difference, the method comprising the steps of:
generating a clock_A and a clock_B having the phase difference therebetween;
generating a triggering signal by either the clock_A or the clock_B for triggering a switch command unit;
transforming an input switching signal into an output switching signal by the triggering signal of the switch command unit, located on either a first rising or a first falling edge of the triggering signal after receiving the input switching signal;
selecting either the clock_A or the clock_B using a selecting device according to the output switching signal from the switch command unit; and
outputting a clock-switching signal composed of the clock_A and the clock_B from the selecting device.

18. The system of claim 17, wherein outputting the clock-switching signal from the selecting device is when both the clock_A and the clock_B are high or low.

19. The method of claim 17, during the step of transforming the input switching signal, further comprising switching the clock_A and the clock_B by inputting a selecting signal into a second selecting device in the switch command unit to generate an gating clock signal corresponding to the triggering signal.

20. The method of claim 19, before the step of switching the clock_A and the clock_B, further comprising gating the input switching signal according to the gating clock signal to generate the output switching signal.

21. The system of claim 20, wherein one edge of the output switching signal following one edge of the input switching signal is aligned to one edge of the gating clock signal.

22. The system of claim 21, during the step of outputting the clock-switching signal, the clock-switching signal switches at the edge of the clock_A and clock_B which has the lag phase respect to another.

23. The system of claim 17, wherein one edge of the output switching signal following one edge of the input switching signal is aligned to one edge of the one of the clock_A or the clock_B which has a lag phase respect to another to serve as the triggering signal.

* * * * *